US012626421B1

(12) United States Patent
　　Harney

(10) Patent No.: US 12,626,421 B1
(45) Date of Patent: *May 12, 2026

(54) SYSTEM, METHOD, AND COMPUTER PROGRAM FOR AUTOMATICALLY GENERATING BRANCH SCENES FOR A BRANCHING VIDEO

(71) Applicant: GoAnimate, Inc., San Mateo, CA (US)

(72) Inventor: Matthew Harney, Bangkok (TH)

(73) Assignee: GoAnimate, Inc., San Mateo, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/513,203

(22) Filed: Nov. 17, 2023

Related U.S. Application Data

(60) Provisional application No. 63/541,724, filed on Sep. 29, 2023.

(51) Int. Cl.
　　*G06T 11/00* (2026.01)
　　*G06F 40/40* (2020.01)
　　*G06V 10/764* (2022.01)

(52) U.S. Cl.
　　CPC .............. *G06T 11/00* (2013.01); *G06F 40/40* (2020.01); *G06V 10/764* (2022.01)

(58) Field of Classification Search
　　CPC ........ G06T 11/00; G06F 40/40; G06V 10/764
　　USPC .......................................... 345/418; 386/230
　　See application file for complete search history.

(56) References Cited

U.S. PATENT DOCUMENTS

| | | | |
|---|---|---|---|
| 9,805,378 B1 | 10/2017 | Wei et al. | |
| 11,226,726 B1 * | 1/2022 | Letteri ................. | G06Q 10/103 |
| 11,315,602 B2 | 4/2022 | Wu et al. | |
| 11,748,988 B1 | 9/2023 | Chen et al. | |
| 11,830,192 B2 * | 11/2023 | Barbash .............. | A61B 5/7246 |
| 12,081,827 B2 | 9/2024 | Black et al. | |
| 12,136,442 B1 * | 11/2024 | Harney .............. | G11B 27/031 |
| 12,136,443 B1 * | 11/2024 | Harney .............. | G06F 16/7867 |
| 12,142,301 B1 * | 11/2024 | Harney .................. | G06N 3/044 |
| 2004/0139481 A1 * | 7/2004 | Atlas ...................... | G06Q 10/10 725/135 |
| 2011/0126106 A1 * | 5/2011 | Ben Shaul ............. | G11B 27/34 715/723 |
| 2012/0236201 A1 * | 9/2012 | Larsen ................... | G06Q 30/02 348/468 |

(Continued)

*Primary Examiner* — Prabodh M Dharia
(74) *Attorney, Agent, or Firm* — Lessani Law Group, PC

(57) ABSTRACT

This disclosure pertains to a system, method, and computer program for automatically creating branching scenes for videos within a video production workspace. The workspace offers a call-to-action feature that enables a user to initiate the automated creation of branching scenes using a natural language request. In response to receiving a request for branching scenes, the system identifies the video's current state within the workspace, discerning scenes, assets, and timelines within the video. System-defined attributes of the assets in the current state, as well as user-defined attributes for the branch, guide the branching process. These attributes are inputted into a generative AI model, which generates a branching narrative for the video and outputs structured data files describing the branching scenes. The branching scenes are rendered in the workspace for user review and refinement. Users can further refine scenes by inputting further instructions for the AI model.

17 Claims, 3 Drawing Sheets

AUTOMATIC VIDEO BRANCH CREATION

(56) References Cited

U.S. PATENT DOCUMENTS

| | | | |
|---|---|---|---|
| 2013/0094830 A1* | 4/2013 | Stone | H04N 5/775 |
| | | | 386/230 |
| 2017/0238055 A1 | 8/2017 | Chang et al. | |
| 2019/0304156 A1* | 10/2019 | Amer | G06F 18/22 |
| 2019/0333513 A1 | 10/2019 | Cao et al. | |
| 2020/0043121 A1 | 2/2020 | Boyce et al. | |
| 2021/0060404 A1 | 3/2021 | Wanke et al. | |
| 2021/0258647 A1* | 8/2021 | Bloch | H04N 21/44218 |
| 2022/0150582 A1 | 5/2022 | Nishimura | |
| 2022/0224963 A1* | 7/2022 | Herz | H04N 21/44218 |

* cited by examiner

AUTOMATIC VIDEO BRANCH CREATION

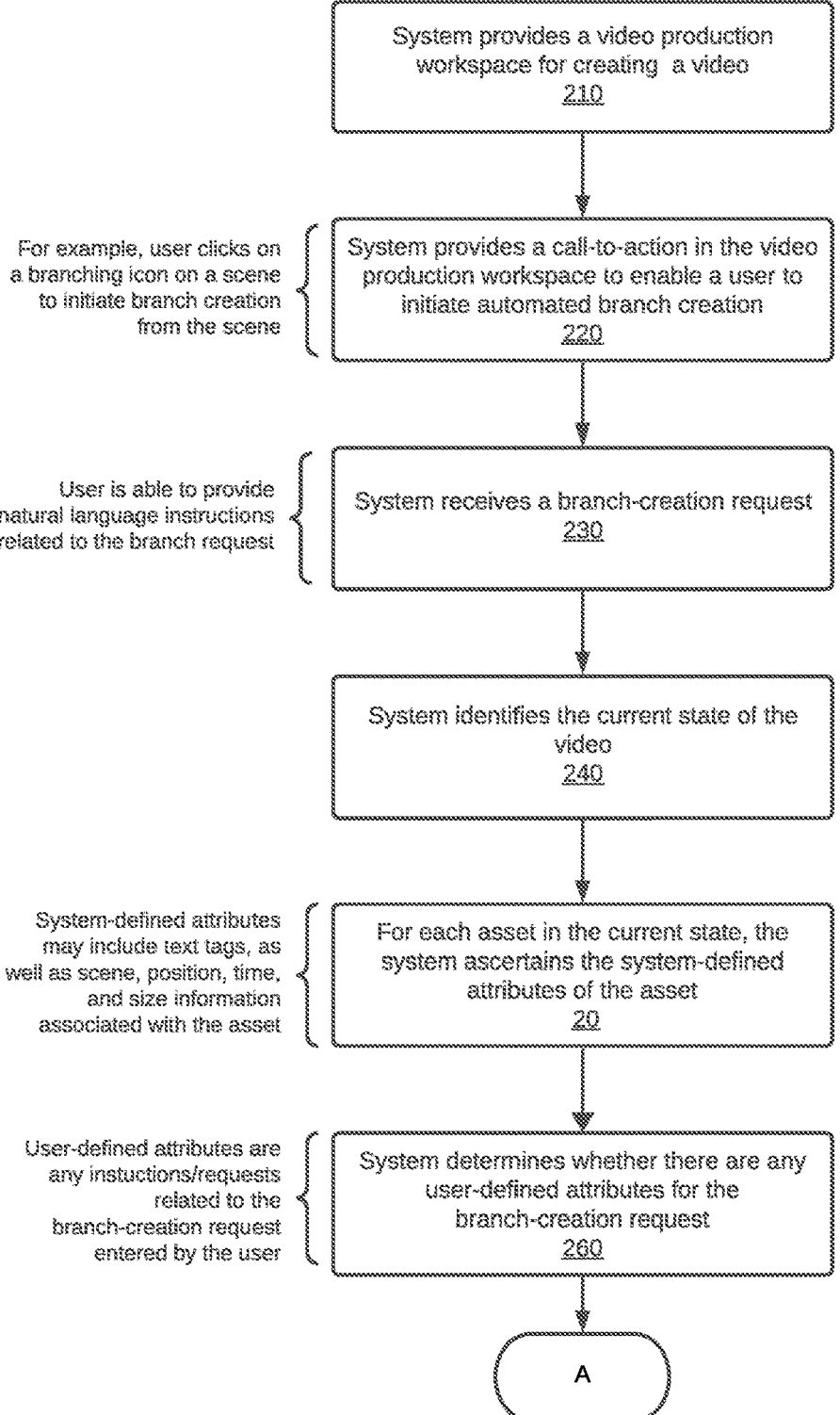

System provides a video production
workspace for creating a video
210

For example, user clicks on
a branching icon on a scene
to initiate branch creation
from the scene System provides a call-to-action in the video
production workspace to enable a user to
initiate automated branch creation
220

User is able to provide
natural language instructions
related to the branch request System receives a branch-creation request
230

System identifies the current state of the
video
240

System-defined attributes
may include text tags, as
well as scene, position, time,
and size information
associated with the asset For each asset in the current state, the
system ascertains the system-defined
attributes of the asset
20

User-defined attributes are
any instuctions/requests
related to the
branch-creation request
entered by the user System determines whether there are any
user-defined attributes for the
branch-creation request
260

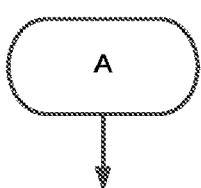

A

System inputs the system-defined attributes
of all assets in the current state, as well as
any user-defined attributes for the
branch-creation request, along with a
request for branching scene descriptions
into a generative AI model
270

Generative AI model generates a narrative
for the video branch and outputs one or
more structured data files, readable by the
system, that describes the branching
scenes in accordance with the created
narrative
280

System uses the structured data files
outputted by the generative AI model to
render the branch scenes in the video
production workspace
290

*FIG. 2B*

SYSTEM, METHOD, AND COMPUTER PROGRAM FOR AUTOMATICALLY GENERATING BRANCH SCENES FOR A BRANCHING VIDEO

RELATED APPLICATIONS

This application claims the benefit of U.S. Provisional Application No. 63/541,724 filed on Sep. 29, 2023, and titled "Interactive Branching Generation," the contents of which are incorporated by reference herein as if fully disclosed herein.

FIELD OF THE INVENTION

This invention relates generally to video generation using artificial intelligence and, more specifically, to automatically generating branching scenes for a branching narrative video based on a current state of a video and any user input for the branching narrative.

BACKGROUND

Branching video is a common way to use the medium of digital video to create interactive stories, courses, and quizzes. Unlike traditional videos that are a linear collection of individual scenes played in a predetermined sequence, branching videos give viewers the ability to influence the narrative by making choices. These choices determine which scene is displayed next, providing an interactive experience.

For example, a branching video might pause playback and allow the user the option of picking one of two or more options as a way of choosing what happens next in their viewing journey. The next scene shown to the user would depend on the option they chose. This allows a linear, non-interactive media such as video to appear as interactive and gives the viewer the ability to choose his or her own story.

As an example, imagine a video scene of an actor standing next to a door. A text prompt may ask the viewer, "Open Locked Door?[YES] or [NO]." Two follow-up scenes are available: one where the door opens and another where the actor is unsuccessful and requires a key. The follow up scene played depends on the user's response to the question of whether the actor will be able to open the locked door. While the overarching narrative remains largely similar across the two follow-up (child) scenes, small yet crucial variations exist, making the production of such videos intricate.

Traditional video production is inherently labor-intensive, necessitating the manual selection and sequencing of video clips, foley sounds, audio tracks, and other media elements. Crafting high-quality videos demands significant time and expertise. The introduction of branching paths complicates this process exponentially. It requires much more planning than normal video due to the non-linear and combinatorial effects of working with branching video. A graph like production structure is needed where the states of props, environments, actors, and costume is mapped out ahead of time and pre-recorded. Every potential narrative permutation based on viewer choices must be planned, recorded, and produced.

A major difference between linear and branching videos lies in the repetition of various elements across the video production. Scenes in branching videos often mirror one another with only minor dialogue changes or other small differences. Presently, similar scenes must be filmed or animated separately, leading to a tremendous duplication of effort. Given the myriad combinations stemming from settings, actors, props, and dialogue for each narrative branch, the production process can quickly become overwhelming. Additionally, the inherently iterative nature of the creative process means that changes to early scenes can necessitate re-shooting or re-animating all subsequent scenes, including every branching path.

Therefore, there is strong demand for a solution to automate and streamline the management and production of branching videos in order to significantly reduce the time and effort required by current methodologies.

SUMMARY OF THE INVENTION

This disclosure relates to a system, method, and computer program for automatically creating branching scenes for branching narrative videos based on a current state of the video and any user input regarding the branching narrative and/or scenes. The system provides a video production workspace where users can create scenes for a video by adding multimedia assets to the scenes such as text, images, video clips, animations, characters, backgrounds, props, and the like.

The workspace includes a call-to-action feature (e.g., a clickable button or a command menu option) that enables users to initiate the creation of branching narratives within their video. Users can provide natural language instructions for the branching video or, in some embodiments, even voice requests to guide the branching process. The user input for the branching scenes may be very specific or a high-level directive. The user may add assets to a scene before requesting that the video branch from that scene or the user may create a blank scene and have the system create both the parent and child branch scenes. The user may also enter a branch creation request without creating any scenes and have the system generate an entire narrative and all the scenes for the video based on some user-defined instruction ("create a branching video with questions and answer choices how to add fractions with different denominators").

Upon receiving a branching request, the system identifies the current state of the video, which encompasses discerning existing scenes, the various assets contained within them, and their associated timelines. For every asset, the system obtains system-defined attributes (i.e., metadata) associated with the assets. If assets, especially user-uploaded ones like images or video clips, lack this metadata, the system harnesses computer vision models to deduce and classify intrinsic attributes, treating these inferred attributes as system-defined.

Additionally, the system is designed to receive and incorporate user-defined attributes, which could be specific directives or characteristics that the user wants the branching scenes to exhibit. All these attributes, both system-defined and user-defined, are then fed into a generative AI model. In certain embodiments, this AI model can be a general purpose large language model like ChatGPT or a variant retrained specifically for video branching purposes. This model then crafts a branching narrative and outputs structured data files that detail the branching scenes as per the narrative. The user is able to guide the output of the generative AI model based not only on natural-language instructions, but also based on the assets the user has added to the current state of the video.

Using these data files, the system renders the branching scenes within the video production workspace for user review. Post-rendering, users are able to tweak and refine the branching scenes, by making specific requests to modify appearance, text, or audio elements. Such refinements are again fed into the generative AI model to achieve the desired output, ensuring the user has comprehensive control over the branching narrative process.

In one embodiment, a method for automatically and interactively creating branching video scenes comprises the following steps:

providing a call to action in the video production workspace to enable a user to initiate automated creation of scenes for a branching narrative in a video being created within the video production workspace;

in response to receiving user input to create scenes for a branching narrative in a video being created in the video production workspace, performing the following:

identifying a current state of the video in the video production workspace, including identifying all the assets in the current state of the video;

obtaining metadata related to assets in the current state of the video;

inputting said metadata into a generative AI model configured to generate a branching narrative for the video and output data describing a plurality of branching scenes for the branching narrative; and rendering the branching scenes in the video production workspace in accordance with the data outputted by the generative AI model, wherein the branching scenes are incorporated into a video timeline such that child branching scenes follow a parent branch scene.

BRIEF DESCRIPTION OF THE FIGURES

FIGS. 2A-B are flowcharts that illustrate a method, according to one embodiment, for automatically generating branching scenes for a video.

DETAILED DESCRIPTION OF THE PREFERRED EMBODIMENTS

Figure 1:
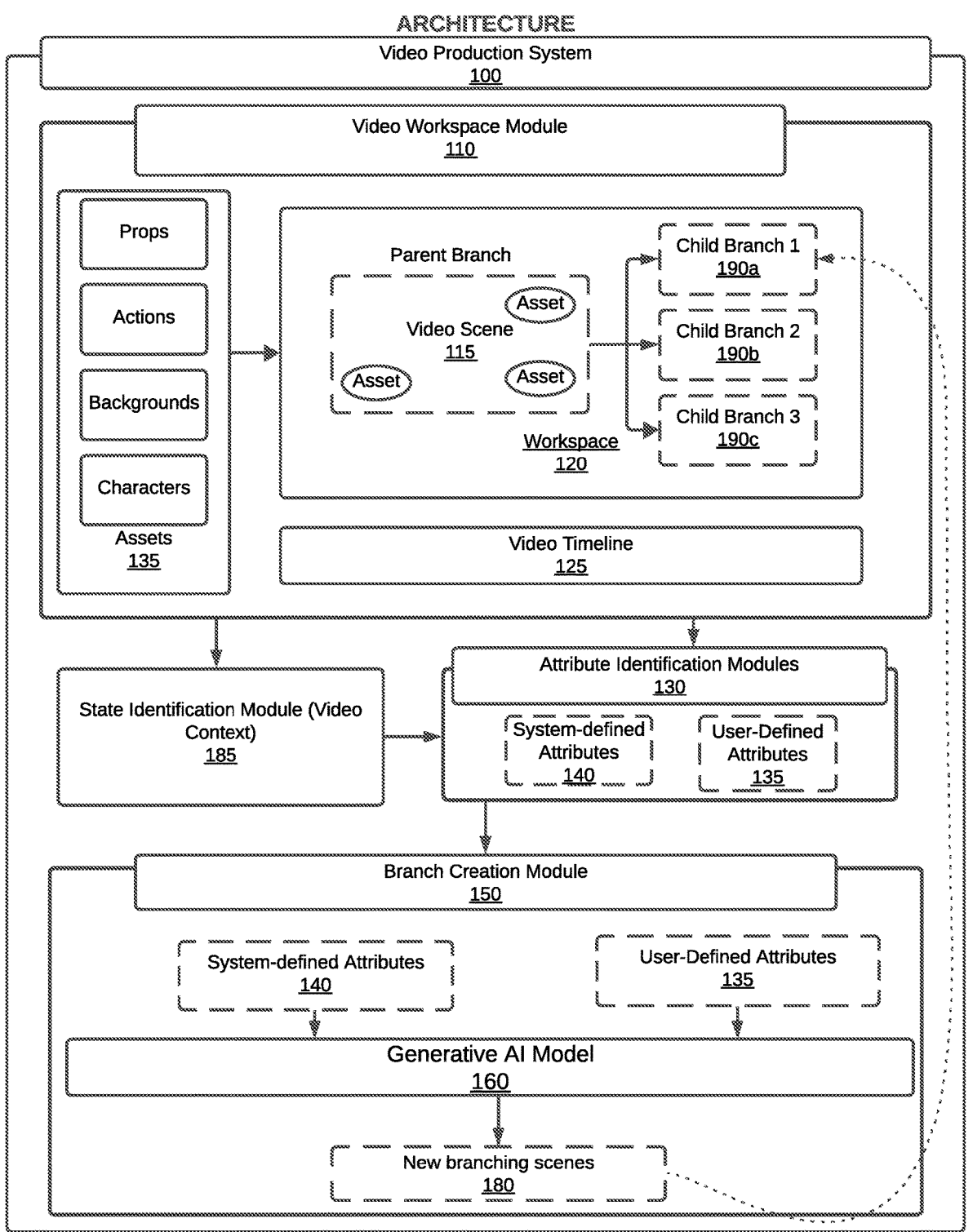
FIG. 1 is a block diagram that illustrates an example software architecture of a video production system according to one embodiment.

This disclosure relates to a system, method, and computer program for automatically generating branching scenes for a branching video based on a current state of the video and any user-defined attributes for the branching narrative and/or scenes. The method is performed by a computer system ("the system").

1. Definitions

An asset is an element of a video. An asset may be any number of multimedia types, such as audio, video, voice, images, animations, text. Assets also may include proprietary video asset types (as might be known to a video production software), such as characters, character actions, backgrounds, and props.

A scene is a virtual stage in a user interface of a video production software on which a user can arrange assets for a video. A video typically comprises a series of scenes.

2. Overview

The system provides a novel way to produce branching scenes for a video. The system enables a user to enter, within a video production workspace, a natural language request for branching scenes. In response to receiving the request, the system identifies the current state of a video, including the assets, scenes, and timelines in the video. Attributes of the current state of the video, as well as user instructions related to the branching scenes and/or branching narrative, are then used to guide the output of a generative AI model. In this way, the branching generation process is both interactive and automatic. The generative AI model generative a branching narrative for the video and outputs data files describing the branching scenes. The system renders the branching scenes based on the outputted data files.

3. Example Software Architecture

FIG. 1 illustrates an example architecture for the system. The system 100 includes a Video Workspace Module (VWM) 110 that provides a video production workspace 120 in which a user can produce and edit videos. The workspace includes a video timeline 125 that illustrates the order and time in which scenes in the video appear. A user adds assets 135 to the workspace 120 to create scenes for the video (e.g., scene 115). The type of assets that a user is able to add include both generic media forms, such as text, audio, images, animation, and video, and proprietary video asset types, such as characters, character actions, backgrounds, and props. For simplicity, only an exemplary sampling of asset types is illustrated in FIG. 1.

The system includes a State Identification Module 185 that identifies a current state of the video. This including identifying each scene created for a video and then, for each scene, identifying the assets in the scene and the timeline associated with the scene.

The system also includes Attribute Identification Modules 130. The Attribute Identification Modules include one or more modules that identify system-defined attributes 140, such as metadata tags, of each asset in the current state of the video. For example, a cartoon character for a man at beach may be associated with the following metadata tags: "character," "cartoon", "2D", "man "beach," "summer," and "travel." These metadata tags are system-defined attributes.

One or more of the Attribute Identification Modules 130 may also identify any user-defined attributes 135 for a branch creation request. In one embodiment, a user may enter natural language instructions (i.e., user-defined attributes) for the branch creation within the workspace.

The system includes a Branch Creation Module (BCM) 150 with a Generative AI Model 160. The system-defined attributes of assets in the current state, as well as any user-defined attributes for the branching request, are inputted into the Generative AI Model 160. In one embodiment, the system-defined attributes for each assets include metadata tags associated with the asset, the scene in which an asset resides, the asset position within a scene, the asset size in the scene, and the timeline associated with the scene. In response to receiving the aforementioned input, the Generative AI model generates a branching narrative for the request and outputs a structured data file 180 describing the branching scenes. The Video Workspace Module 110 uses the structured data file to render the branching scenes 190a-190b.

In certain embodiments, the Video Workspace Module 110 for the video production system executes on client computers, and the Branch Creation Module 150 runs on a backend server. The client computers send branch generation requests via an API over the Internet or other network.

Data may be transferred between client computers and the backend server using JSON format. For the example, if one of the assets in the video scene is a 3D woman in an office scene, the system-defined attributed could expressed in JSON format as follows:

"system_defined_attribute": "character, image, woman, office, 3D, glasses",
"id": "1"
"data": "<encoded>" }

The "id" corresponds to a unique ID for each asset in the video production workspace.

4. Method for Automatically Creating Branching Video Scenes

FIGS. 2A-B illustrate a method for automatically creating branching scenes in a video based on the current state of the video and user input.

The system provides a video production workspace for creating scenes for a video (step 210). The system enables a user to create scenes and add assets to the scenes in the workspace. The user is able to add a number of different multimedia asset types to the workspace, including text, images, video clips, and animations. These may come in form of characters, props, backgrounds, etc.

The system provides a call-to-action in the video production workspace to enable a user to initiate automated creation of scenes for a branching narrative in the video being created within the video production workspace (step 220). For example, the system may add a "plus sign" button to each scene added to the workspace. When a user clicks on the plus sign, a window pops up in which a user can enter a request for a branch at this point in the video, where the user can provide natural language instructions/requests for the branch creation. In certain embodiments, the user is able to speak a natural language request for the branching scenes. The user may add assets to a scene before requesting that the video branch from that scene, or the user may create a blank scene and have the system create both the parent and child branch scenes. The user may also enter a branch creation request without creating any scenes and have the system generate an entire narrative and all the scenes for the video based on some user-defined instruction ("create an interactive branching video with questions and answer choices for what to do in case of a house fire").

When the system receives a branch-creation request for a selected scene or for the video as a whole (step 230), the system ascertains a current state of the video (step 240). In one embodiment, this includes identifying the scenes (if any) in the current state and identifying the assets within each scene, as well as the timeline associated with each scene. For each asset in the current state, the system retrieves the system-defined attributes (i.e., metadata) associated with the asset, such as the metadata tags associated with the assets, the scene in which the asset is in, the position of the asset within a scene, the timeline associated with the scene, and asset size dimensions (step 250). Images or video clips uploaded by a user may not initially have associated metadata tags. In such case, the system may infer attributes of the asset using computer vision models to identify and classify elements in the uploaded clip. The system may also infer attributes from the title of a video clip (e.g., "cat.mp4"). The inferred attributes are treated as system-defined attributes.

The system also determines whether there are any user-defined attributes for the branch-creation request (step 260). In requesting a branch creation, the user may specify certain attributes for the branching scenes (e.g., "create questions and answers for a branching scene asking a user what to do in case of fire in the house where the character is in an upstairs bedroom of a house").

The system then inputs the system-defined attributes of all the assets in the current state of the video, as well as any user-defined attributes for the branch, along with a request for branching scene descriptions into a generative AI model (step 270). In one embodiment, the generative AI model is a large language AI model, such as ChatGPT. In an alternate embodiment, the generative AI model is a large language model retrained specifically for creating branching scenes for videos. The generative AI model generates a narrative for the video branch and outputs one or more structured data files, readable by the Video Workspace Module, that describes the branching scenes in accordance with the created narrative (step 280). For example, the data file may include descriptions of the parent and child scenes (e.g., assets in the scene, location and size of the assets, background images in the scene, audio for the scene, etc.), camera shots, character dialogue and the questions to be shown to the user in the parent branch. In scenarios where the parent scene has already been created, the output describes the child scenes branching from the parent scene, including descriptions of any character dialogue or actions responding to the user's choice. If the parent scene has not already been created, then the output also includes a description of the parent scene from which the child scenes branch off, including the dialogue related to the questions/choices presented to the user in the parent scene. Because both attributes related to the current state of the video and user-defined attributes for the branching narrative are fed into the generative AI model, the user is able to guide the output of the generative AI model based not only on natural-language instructions, but also based on the assets the user has added to the current state of the video.

The system uses the structured data files outputted by the generative AI model to render the branching scenes in the video production workspace for the user review (step 290). The user is able to further refine the branching scenes by requesting further refinements/changes to the scenes (e.g., "change the actor to a woman," "make the dialog language simpler," and "add more props to the scene.") These additional user-defined attributes are inputted into the generative AI model to further refine the branching scenes.

5.0 General

The methods described with respect to FIGS. 1 and 2A-2B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions. The method described with respect to FIGS. 2A-2B may be implemented by the system illustrated in FIG. 1, but the method is not limited to this architecture.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for automatically creating branching scenes for branching videos, the method comprising:

providing a multimedia video production workspace for creating scenes for a video, wherein the multimedia video production workspace includes a video timeline that illustrates an order and time in which scenes in the video appear;

providing a call-to-action in the video production workspace to enable a user to initiate automated creation of scenes for a branching narrative in a video being created within the video production workspace;

in response to receiving user input to create scenes for a branching narrative in a video being created in the video production workspace, performing the following:

identifying a current state of the video in the video production workspace, including identifying all the assets in the current state of the video;

obtaining metadata related to assets in the current state of the video;

inputting said metadata into a generative AI model configured to generate a branching narrative for the video and output data describing a plurality of branching scenes for the branching narrative; and rendering the branching scenes in the video production workspace in accordance with the data outputted by the generative AI model, wherein the branching scenes are incorporated into the video timeline such that child branching scenes follow a parent branch scene.

2. The method of claim 1, further comprising receiving natural language input from the user with user-defined attributes for the branching narrative, and inputting said user input into the generative AI model in addition to the metadata related to the current state of the video to obtain a branching narrative and corresponding branching scenes that comply with the user's natural language input.

3. The method of claim 1, wherein the output data from the generative AI model describes at least two child branching scenes.

4. The method of claim 3, wherein the output data further describes a parent branch scene.

5. The method of claim 1, further comprising enabling a user to iteratively transform the branching scenes via a natural language interface.

6. The method of claim 1, wherein metadata for an asset includes metadata tags for the asset, one or more scenes associated with the asset, an asset position, an asset size, and timeline data associated with the asset.

7. The method of claim 6, wherein identifying attributes of the assets in the current state of the video comprising using a computer vision model to classify a visual asset in the video with one or more attributes.

8. A video production system for automatically creating branching scenes for branching videos comprising:

a video workspace module (VWM) that provides a multimedia video production workspace for creating scenes for a video, wherein the VWM enables a user to input a branch generation request, and wherein the multimedia video production workspace includes a video timeline that illustrates an order and time in which scenes in the video appear;

a branch creation module (BCM) configured to receive both the branch generation request and metadata from the VWM related to video scenes in the video production workspace and configured to generate a branching narrative for the video, including a parent branch and two or more child branches; and a generative AI model integrated within the BCM, wherein the BCM utilizes the generative AI model to produce data describing a plurality of branching scenes for the branching narrative.

9. The system of claim 8, wherein the BCM utilizes the generative AI model to produce a question and multiple choice answers related to the branching narrative, with each answer leading to a subsequent scene described in the data outputted by the generative AI model.

10. The system of claim 9, wherein the output of the BCM is a structured data file that is readable by the VWM to render the branching video scenes in the video production workspace.

11. A non-transitory computer-readable medium comprising a computer program, that, when executed by a computer system, enables the computer system to perform the following method for automatically creating branching scenes for branching videos, the method comprising:

providing a multimedia video production workspace for creating scenes for a video, wherein the multimedia video production workspace includes a video timeline that illustrates an order and time in which scenes in the video appear;

providing a call-to-action in the video production workspace to enable a user to initiate automated creation of scenes for a branching narrative in a video being created within the video production workspace;

in response to receiving user input to create scenes for a branching narrative in a video being created in the video production workspace, performing the following:

identifying a current state of the video in the video production workspace, including identifying all the assets in the current state of the video;

obtaining metadata related to assets in the current state of the video;

inputting said metadata into a generative AI model configured to generate a branching narrative for the video and output data describing a plurality of branching scenes for the branching narrative; and rendering the branching scenes in the video production workspace in accordance with the data outputted by the generative AI model, wherein the branching scenes are incorporated into the video timeline such that child branching scenes follow a parent branch scene.

12. The non-transitory computer-readable medium of claim 11, further comprising receiving natural language input from the user with user-defined attributes for the branching narrative, and inputting said user input into the generative AI model in addition to the metadata related to the current state of the video to obtain a branching narrative and corresponding branching scenes that comply with the user's natural language input.

13. The non-transitory computer-readable medium of claim 11, wherein the output data from the generative AI model describes at least two child branching scenes.

14. The non-transitory computer-readable medium of claim 13, wherein the output data further describes a parent branch scene.

15. The non-transitory computer-readable medium of claim 11, further comprising enabling a user to iteratively transform the branching scenes via a natural language interface.

16. The non-transitory computer-readable medium of claim 11, wherein metadata for an asset includes metadata tags for the asset, one or more scenes associated with the asset, an asset position, an asset size, and timeline data associated with the asset.

17. The non-transitory computer-readable medium of claim 16, wherein identifying attributes of the assets in the current state of the video comprising using a computer vision model to classify a visual asset in the video with one or more attributes.

* * * * *